United States Patent
Parker

(10) Patent No.: US 6,755,262 B2
(45) Date of Patent: Jun. 29, 2004

(54) DOWNHOLE LENS ASSEMBLY FOR USE WITH HIGH POWER LASERS FOR EARTH BORING

(75) Inventor: Richard A. Parker, Arvada, CO (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 10/337,000

(22) Filed: Jan. 6, 2003

(65) Prior Publication Data

US 2003/0132029 A1 Jul. 17, 2003

Related U.S. Application Data

(60) Provisional application No. 60/347,750, filed on Jan. 11, 2002.

(51) Int. Cl.[7] .............................. E21B 7/14; E21C 37/16
(52) U.S. Cl. .............................. 175/57; 175/11; 175/16; 175/19; 299/14; 299/3
(58) Field of Search ................................ 175/11, 16, 57, 175/19; 299/14, 3; 219/121.6, 121.84, 121.76, 121.61, 121.65, 121.66; 385/106, 119, 112, 115

(56) References Cited

U.S. PATENT DOCUMENTS

| | | | |
|---|---|---|---|
| 3,383,491 A | * | 5/1968 | Muncheryan .......... 219/121.79 |
| 3,693,718 A | | 9/1972 | Stout |
| 3,699,649 A | * | 10/1972 | McWilliams ................ 29/610.1 |
| 3,821,510 A | * | 6/1974 | Muncheryan .......... 219/121.63 |
| 3,871,485 A | | 3/1975 | Keenan, Jr. |
| 4,066,138 A | | 1/1978 | Salisbury et al. |
| 4,090,572 A | | 5/1978 | Welch |
| 4,113,036 A | | 9/1978 | Stout |
| 4,199,034 A | * | 4/1980 | Salisbury et al. ............. 175/11 |
| 4,266,609 A | | 5/1981 | Rom et al. |
| 4,282,940 A | | 8/1981 | Salisbury et al. |
| 5,107,936 A | | 4/1992 | Foppe |
| 5,168,940 A | * | 12/1992 | Foppe .......................... 175/11 |
| 6,626,249 B2 | * | 9/2003 | Rosa ............................ 175/16 |

FOREIGN PATENT DOCUMENTS

| | | | | |
|---|---|---|---|---|
| JP | 05133180 A | * | 5/1993 | ............. E21B/7/14 |
| JP | 05141169 A | * | 6/1993 | ............. E21B/7/00 |
| WO | WO 97/49893 | | 12/1997 | |

OTHER PUBLICATIONS

U.S. Dept. of Energy: "DOE Fossil Energy Techline" XP002239994, Jun. 2000, Retrieved from Internet:<URL:http://www.fe.doe.gov/techline/tl_baa00_gas.html#gri>.

Office of Fossil Fuel Energy, U.S. Dept. of Energy: "Drilling with Light", XP002239995, Feb. 2001, Retrieved from Internet <URL:http://www.fe.doe.gov/oil_gas/drilling/laserdrilling.shtml>.

(List continued on next page.)

Primary Examiner—David Bagnell
Assistant Examiner—Shane Bomar
(74) Attorney, Agent, or Firm—Mark E. Fejer

(57) ABSTRACT

An earth boring apparatus at least partially locatable within a borehole. The apparatus includes a plurality of optical fibers, each of which has a proximal fiber light energy input end and a distal fiber light energy output end. At least one focal lens is disposed at the distal fiber light energy output end. The focal lens is made up of a plurality of focal elements, each of which corresponds to the distal fiber light energy output end of at least one optical fiber. The focal lens is arranged to receive light energy from the corresponding distal fiber light energy output end of the at least one optical fiber and focus it outwardly from the distal fiber light energy output end.

21 Claims, 3 Drawing Sheets

OTHER PUBLICATIONS

O'Brien et al., "StarWars Laser Technology for Gas Drilling and Completions in the 21st Century," SPE #56625 Oct., 1999, pp. 1–10, XP002239996.

Gahan et al., "Laser Drilling: Determination of Energy Required to Remove Rock", SPE #71466, Sep. 2001, pp. 1–11, XP002239997.

Database Comdex Online!, Engineering Information, Inc. New York, NY, Anonymous, "New Lenses Expand Use of High–Power Lasers," Database Accession No. XP–001148947 (1984).

Graves, R.M. et al., "Targeted Literature Review: Determining the Benefits of StarWars Laser Technology for Drilling and Completing Natural Gas Wells (GRI–98/0163)", Jul. 1998, pp. 5–12 XP–002241041.

* cited by examiner

DOWNHOLE LENS ASSEMBLY FOR USE WITH HIGH POWER LASERS FOR EARTH BORING

This application claims the benefit of Provisional application No. 60/347,750 filed Jan. 11, 2002.

BACKGROUND OF THE INVENTION

1. Field of the Invention

This invention relates to a method and apparatus for earth boring in which the apparatus is locatable at least partially within a borehole. More particularly, this invention relates to a method and apparatus that utilizes high power lasers for earth boring in which an array of optical fibers is constructed and arranged to be positioned downhole in an earth boring operation in communication with a focal lens array, thereby directing laser energy at the earth to break and melt rock.

2. Description of Related Art

The use of lasers for the purpose of producing boreholes to enable the extraction of liquid and gaseous fuels from underground formations is well-known in the art. For example, U.S. Pat. No. 4,266,609 to Rom et al. teaches a method of extracting liquid and gaseous fuels from oil shale and tar sand. Using this method, kerogen and other materials can be extracted by drilling boreholes in a selected pattern through the overlying soil and rock without removing it. Each borehole mouth is closed by a cover provided with an air inlet pipe and a gas exhaust pipe. A laser beam generated by a laser source is introduced into the upper end of the pipe and directed centrally to its bottom where it is diverted toward the borehole wall by a mirror assembly. The laser beam moves along the borehole wall and irradiates the oil shale or tar sand, igniting the combustible matter contained therein, which liquefies and evaporates. This method does not utilize the laser energy to further create the hole, but rather it ignites and burns what otherwise may be valuable recoverable fossil fuels in an effort to extract, through the gas generation, liquid and gas by more conventional means.

U.S. Pat. No. 4,066,138 to Salisbury et al. teaches an earth boring apparatus mounted above ground that directs an annulus of high powered laser energy downwardly for boring a cylindrical hole by fusing successive annular regions of the stratum to be penetrated at a power level that shatters and self-ejects successive cores from the hole. A first fluid blast above the hole deflects the ejected core as it exits from the hole and a second fluid blast above the hole ejects fluid to provide adequate fluid at the strata to be penetrated prior to actuation of the laser for promoting a thermal shock capable of shattering and ejecting the core. Optical sensing separately detects the core shattering and the core ejection to control timed actuation of the system components. Clearly one limitation of this system is its inability to drill non-linear boreholes. In addition, generation of the desired annular pattern as well as controlling timed actuation of the system components requires a reasonably complex arrangement of equipment.

U.S. Pat. No. 4,282,940 to Salisbury et al. teaches an apparatus for perforating oil and gas wells. Using this method, a high-powered coherent light beam is axially directed along the borehole to a predetermined depth and deflected along a beam axis. The beam is focused to concentrate at each of a plurality of spaced focal points along the deflected beam. This, in turn, is said to provide a significant increase in the distance that calculated oil or gas bearing formations can be perforated, thereby increasing the yield by more conventional means.

The use of lasers for drilling is also taught by U.S. Pat. No. 4,113,036 to Stout in which underground boreholes are drilled through a formation from a plurality of vertical boreholes by use of laser beams to form a subsurface, three-dimensional bore passage pattern for in situ preparation of fossil fuel deposits to be recovered and a laser beam is projected vertically through an angularly adjusted tubular housing inserted into each borehole from which a reflected drilling beam is laterally directed by an angularly adjusted reflector to form a bore passage; U.S. Pat. No. 3,871,485 to Keenan, Jr. in which a laser beam generator positioned in a wellhole is electrically connected to an inhole voltage generator actuated by drilling mud or other liquid passing through a laser beam housing connected to the drill string and a reflecting crystal for the laser beam is positioned within the laser beam housing to reflect the beam in an elliptical pattern across the formation to be penetrated; U.S. Pat. No. 4,090,572 to Welch in which a laser beam for drilling gas, oil or geothermal wells in geological formations and for "fracing" the pay zones of such wells to increase recovery is projected into a wellbore along a beam guide so as to make available laser energy adequate to melt or vaporize the formation under downhole conditions; and U.S. Pat. No. 5,107,936 to Foppe in which a gap defining the outer profile of a borehole is melted down and the drill core surrounded by this gap is extracted at intervals through the melting zone.

It will be apparent to those skilled in the art that several of these apparatuses require the use of complex and fragile equipment and some of these apparatuses are inherently expensive, difficult to operate properly, difficult to maintain and exceedingly fragile, particularly in view of the hostile environment in which they are used. Thus, there is a need for high powered laser drilling equipment that addresses each of these issues.

Another problem associated with conventional methods and apparatuses that utilize high power lasers for fossil fuel recovery is that they require the use of movable mirrors, which are difficult to position and to control.

Yet a further problem associated with conventional methods and apparatuses employing high power lasers for fossil fuel recovery is that they utilize many moving parts that cannot be readily maintained in the field.

Still a further problem associated with conventional methods and apparatuses employing high power lasers for fossil fuel recovery is that they require a complex assortment of relatively minute components that are susceptible to damage from numerous adverse conditions in the field, particularly in view of the surrounding hostile environment.

Yet another problem associated with conventional methods and apparatuses employing high power lasers for fossil fuel recovery is that they are not adaptable to directional drilling or holes that are other than straight.

An even further problem associated with conventional methods and apparatuses employing high power lasers for fossil fuel recovery is that a laser beam directed downward into a hole is subject to dissipation and misdirection due to the presence of fluid, dust and/or other materials within the hole.

SUMMARY OF THE INVENTION

Accordingly, it is one object of the present invention to provide a method and apparatus for earth boring using high powered lasers that seeks to overcome the problems discussed above and which is readily adaptable to a variety of applications.

More particularly, it is one object of this invention to provide a downhole lens assembly for use in connection with high-powered lasers for earth boring that does not require complex apparatuses which are difficult to maintain in the field.

It is another object of this invention to provide a downhole lens assembly for use in connection with high-powered lasers for earth boring that does not require the use of movable mirrors which are difficult to position and control.

It is yet another object of this invention to provide a downhole lens assembly for use in connection with high-powered lasers for earth boring that does not require many moving parts that cannot be readily maintained in the field.

It is still a further object of this invention to provide a downhole laser assembly for use in connection with high-powered lasers for earth boring that does not require a complex assortment of minute components that are susceptible to heat damage and damage from other adverse conditions in the field.

Additionally, it is an object of this invention to provide a downhole lens assembly for use in connection with high-powered lasers for earth boring that is adaptable to use when the path of a bore is not straight, thereby rendering the apparatus suitable for directional drilling.

Still a further object of this invention is to provide a downhole lens assembly for use in connection with high-powered lasers for earth boring that transfers the laser energy downward into the hole so that it is not subject to dissipation and misdirection due to the presence of fluid, dust and/or other materials within the hole.

These and other objects of this invention are addressed by an earth boring apparatus that is at least partially locatable within a borehole, which apparatus comprises a plurality of optical fibers, each of which has a proximal fiber light energy input end and a distal fiber light energy output end. At least one focal lens is disposed at the distal fiber light energy output end of the plurality of optical fibers, which focal lens comprises a plurality of focal elements, each of which corresponds to the distal fiber light energy output end of at least one of the optical fibers and which is arranged to receive light energy from the corresponding distal fiber light energy output end of the at least one optical fiber and focus the light energy outward from the distal fiber light energy output end. In accordance with a particularly preferred embodiment, the plurality of optical fibers are disposed in a flexible casing, thereby forming an optical fiber bundle. Because the progress of the apparatus in the borehole does not depend on crushing the rock by application of weight as in conventional drilling systems, the entire apparatus may be constructed of much lighter weight materials, such as fiber reinforced composites.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
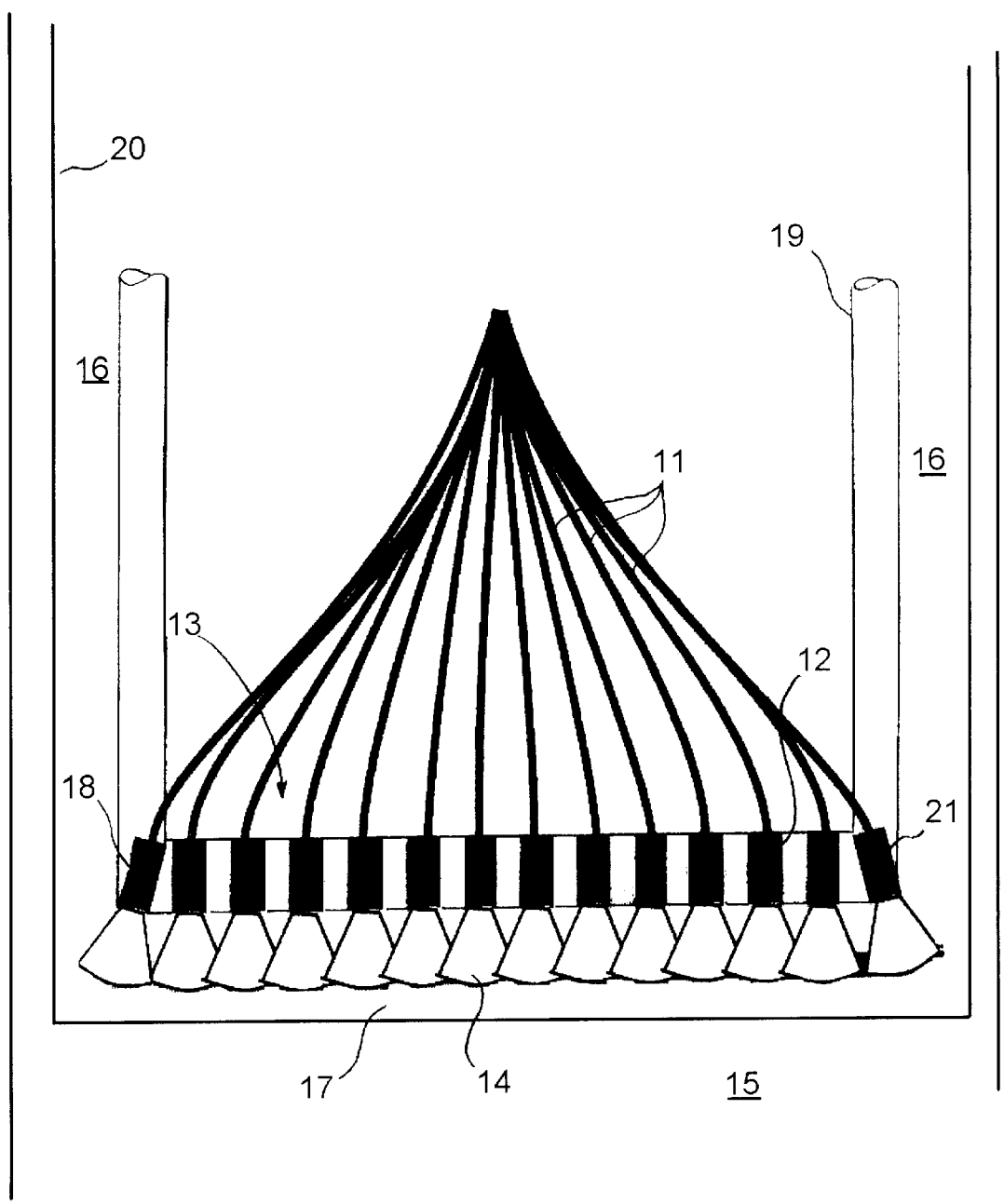
FIG. 1 is a cross-sectional side view of the distal end of an earth boring apparatus in accordance with one embodiment of this invention.

Disclosed herein is an earth boring apparatus or "drill", as shown in FIG. 1, that is at least partially locatable within a borehole 16. The apparatus comprises a plurality of optical fibers 11, each of which has a proximal fiber light energy input end, which is typically disposed above the surface of the earth and a distal fiber light energy output end, which is locatable in the borehole 16. A determining factor in the number of optical fibers 11 employed is the desired borehole size. Preferably, at least about 100 optical fibers are employed, although fewer fibers may be sufficient. Disposed at the distal fiber light energy output end of the optical fibers 11 is at least one focal lens 13. As with the number of optical fibers employed, the number of lenses 13 employed is also dependent on the desired borehole size. Focal lens 13 comprises a plurality of focal elements 12, each of which corresponds to the distal fiber light energy output end of at least one of the optical fibers 11. Focal elements 12 are arranged to receive light energy from the corresponding distal fiber light energy output end of the corresponding optical fibers and focus the light energy outward from the distal fiber light energy output end as indicated by the light cones 14. Suitable materials for making focal lens 13 include quartz, sapphire and/or diamond.

Figure 2:
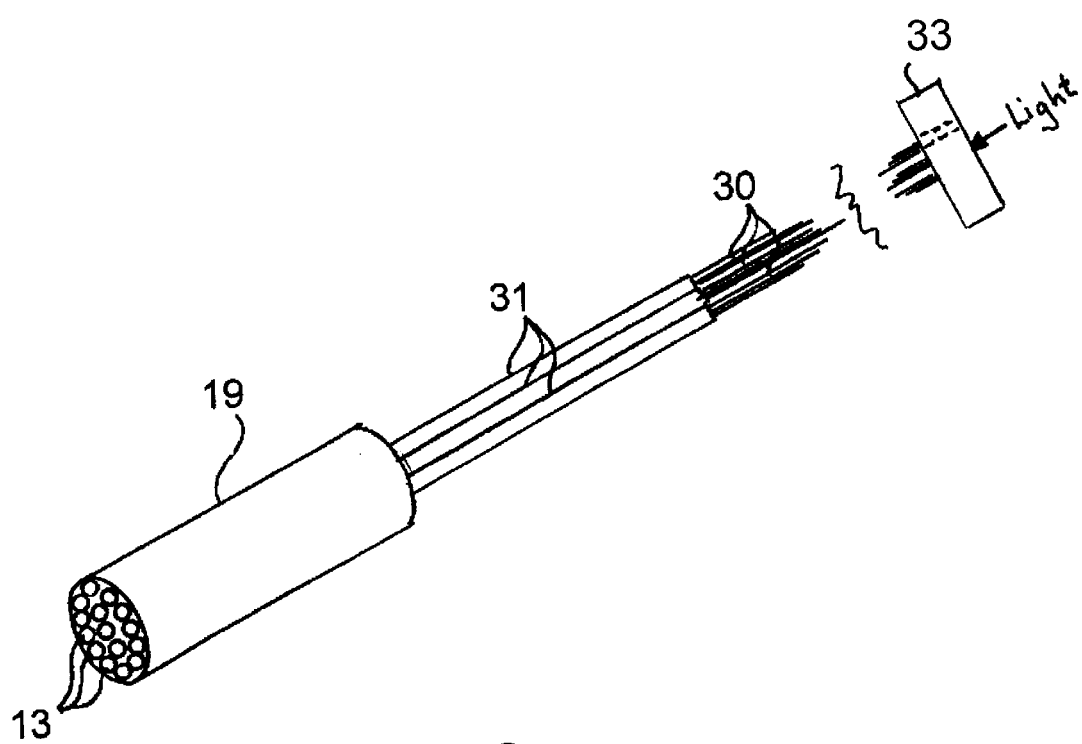
FIG. 2 is a perspective view of the distal end of an earth boring apparatus in accordance with one embodiment of this invention.

As shown in FIGS. 1 and 2, the at least one focal lens 13 is surrounded by a protective shell 19 to protect the focal lens from the environment in which the apparatus is used. In accordance with one preferred embodiment, the protective shell is constructed of a composite material. In accordance with another embodiment, the protective shell is constructed of metal.

As shown in FIG. 1, a substantial portion of the focal elements 12 that make up the focal lens 13 are directed substantially in a forward direction, perpendicular to the end face of the distal fiber light energy output end of the optical fibers 11. Preferably, the majority of the optical fibers 11 are aligned so as to emit light energy straight out of the end of the apparatus and the focal length of the focal lenses 13 is sufficient to provide beam overlap at the optimal working distance, thereby allowing the combination of the beams to remove material from the entire diameter of the borehole.

In accordance with one preferred embodiment of this invention, a first portion of the focal elements 18 are directed substantially outwardly at a first angle of deviation from the forward direction of the apparatus in operation to enable the removal of material from a borehole diameter greater than that of the apparatus.

In accordance with another preferred embodiment of this invention, a second portion of the focal elements 21 are directed substantially outwardly at a second angle of deviation from said forward direction, the purpose of which is to enable melting of the wall rock surrounding the borehole, thereby creating a sheath of material to stabilize and protect the borehole from collapse and long-term contact with drilling fluids.

In accordance with one preferred embodiment of this invention, light transmission control means 33 are provided for selectively changing the first portion of focal elements 18 and/or the second portion of focal elements 21 between a light transmission condition and a no light transmission condition.

Figure 3:
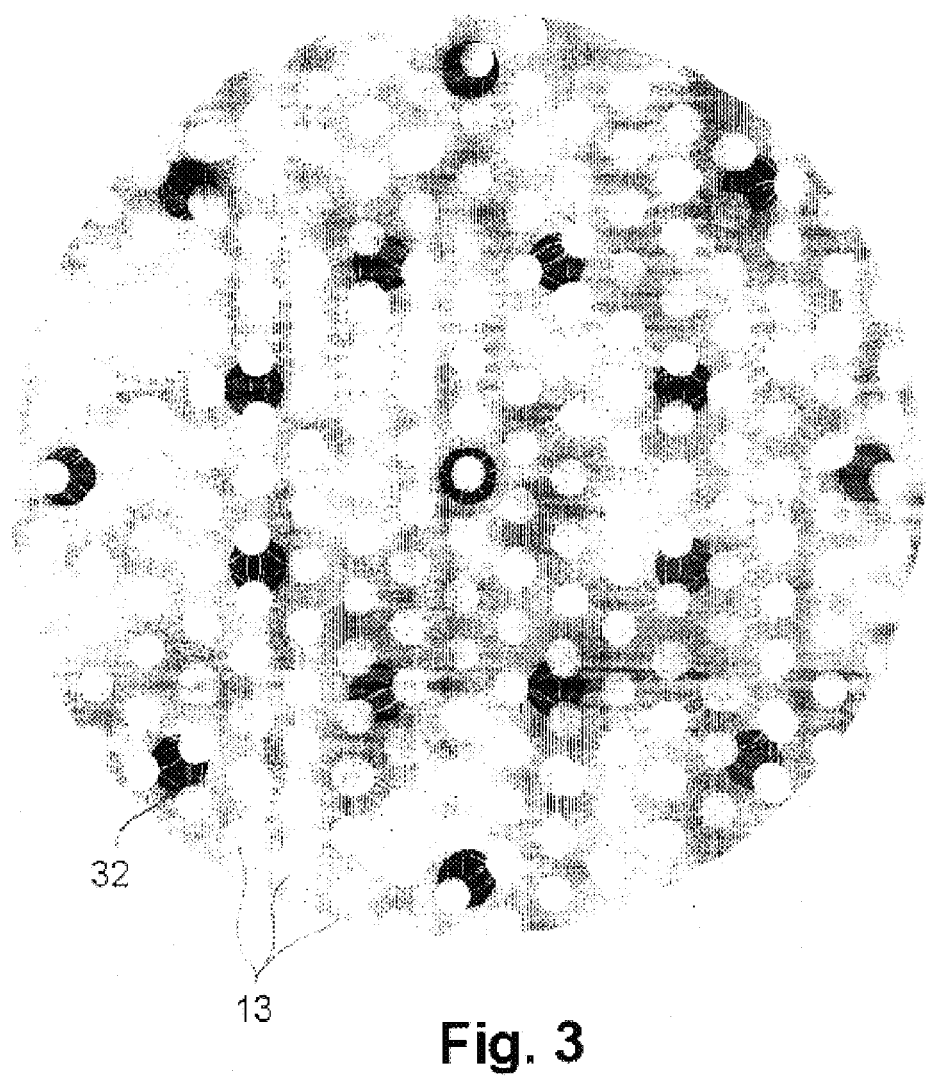
FIG. 3 is a frontal view of the boring end of the earth boring apparatus in accordance with one embodiment of this invention.

FIG. 3 is a depiction of the frontal end of the boring apparatus in accordance with one embodiment of this invention. As can be seen, the apparatus comprises a plurality of focal lens 13, which are typically about ¼ inch in diameter.

Suitable optical fibers for use in the apparatus of this invention have a diameter of about 2 mm.

In accordance with one embodiment of this invention, the boring apparatus further comprises cooling means for cooling the apparatus in the borehole. As shown in FIG. 3, in accordance with one embodiment of this invention, the cooling means comprises at least one cooling duct having a coolant outlet 32 for directing coolant downwardly through borehole 16 to control the cooling of the apparatus. In addition, the coolant may also be employed to remove rock or other material that has been broken by the focused light energy during operation of the apparatus from the front of the focal lens.

In accordance with one embodiment of this invention, the materials in the borehole are melted by the high powered light energy. Coolant which is directed into the borehole 16 through coolant outlets 32 forces the molten material away from the front of the apparatus and against the sides of the borehole 16 where it hardens, forming borehole wall 20.

As shown in FIG. 2, a plurality of the optical fibers 11 are disposed in a flexible casing 31, forming an optical bundle 30. In accordance with one embodiment of this invention, the earth boring apparatus comprises a plurality of optical bundles, each of which is associated with at least one focal lens.

Control of the earth boring apparatus of this invention is effected by equipment disposed at or above the earth's surface, which equipment is operably connected to the proximal fiber light energy input end of the optical fibers. This equipment typically comprises abeam splitter, optical fiber beam injection system and beam redirection mechanism. The injection system is capable of accessing some or all of the optical fibers at any given time. A "rotation" of the light beams through the fibers provides the capability of simulating the action of a traditional rotating bit with successive fibers being actuated in the way that successive sets of teeth impact the work face.

In accordance with the method of this invention, a borehole is created in the earth by directing a light energy source that produces or emits light energy in the infrared spectrum in a forward direction onto a surface to be bored, that is, the earth's surface, selectively focusing the light energy source on a focal area initially disposed on the surface to be bored to effect melting and/or breaking apart of the material disposed in the focal area. The material that has been melted or broken apart by the light energy is removed from the focal area, resulting in formation of the borehole.

In accordance with one embodiment of this invention, a portion of the light energy source is selectively focused outwardly at an angle with respect to the forward direction of the apparatus.

The light energy source utilized in the method of this invention comprises a plurality of optical fibers having a distal fiber light energy output end and at least one focal lens disposed at the distal fiber light energy output end. The at least one focal lens comprises a plurality of focal elements, each said focal element corresponding to the distal fiber light energy output end of at least one optical fiber and arranged to receive light energy from the corresponding distal fiber light energy output end of the at least one said optical fiber and to focus the light energy outward from the distal fiber light energy output ends of the optical fibers.

In accordance with one embodiment of this invention, the material to be removed is rock material. The rock material is melted, moved outwardly from the focal area and cooled, thereby creating a hardened casing of material around the periphery of the borehole.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

I claim:

1. An earth boring apparatus at least partially locatable within a borehole, said apparatus comprising:
    a plurality of optical fibers, each said optical fiber having a proximal fiber light energy input end and a distal fiber light energy output end; and
    at least one focal lens disposed at said distal fiber light energy output end and comprising a plurality of focal elements, each said focal element corresponding to said distal fiber light energy output end of at least one said optical fiber and arranged to receive light energy from said corresponding said distal fiber light energy output end of said at least one said optical fiber and focus said light energy outward from said distal fiber light energy output end.

2. An apparatus in accordance with claim 1, wherein said plurality of optical fibers are disposed in a flexible casing, thereby forming an optical fiber bundle.

3. An apparatus in accordance with claim 2 comprising a plurality of said optical fiber bundles.

4. An apparatus in accordance with claim 1, wherein said at least one focal lens is peripherally surrounded by a protective shell.

5. An apparatus in accordance with claim 4, wherein said protective shell is constructed of one of a composite material and a metal.

6. An apparatus in accordance with claim 1, wherein said plurality of focal elements are directed substantially in a forward direction perpendicular to an end face of said distal fiber light energy output end of said optical fibers.

7. An apparatus in accordance with claim 6, wherein a first portion of said focal elements are directed substantially outwardly at a first angle of deviation from said forward direction.

8. An apparatus in accordance with claim 7, wherein a second portion of said focal elements are directed substantially outwardly at a second angle of deviation from said forward direction.

9. An apparatus in accordance with claim 8 further comprising transmission control means for selectively changing at least one of said first portion and said second portion of said focal elements between a light transmission condition and a no light transmission condition.

10. An apparatus in accordance with claim 1, wherein a plurality of focal lenses are disposed at said distal fiber light energy output end of said optical fibers.

11. An apparatus in accordance with claim 1, wherein a number of said optical fibers is at least about 100 fibers.

12. An apparatus in accordance with claim 1 further comprising cooling means for cooling said apparatus in said borehole.

13. An apparatus in accordance with claim 12, wherein said cooling means is adapted to cool said borehole.

14. An apparatus in accordance with claim 13, wherein said cooling means is adapted to remove material from in front of said at least one focal lens.

15. A method for creating a borehole in the earth comprising the steps of:
    directing a light energy source in a forward direction to a surface to be bored, a portion of said light energy source being selectively focused outwardly at an angle with respect to said forward direction;

selectively focusing said light energy source on a focal area initially disposed on said surface to be bored to effect at least one of melting and breaking apart of material disposed in said focal area; and removing said material from said focal area, thereby creating said borehole.

16. A method in accordance with claim 15, wherein said light energy source comprises a plurality of optical fibers having a distal fiber light energy output end and at least one focal lens disposed at said distal fiber light energy output end comprising a plurality of focal elements, each said focal element corresponding to said distal fiber light energy output end of at least one said optical fiber and arranged to receive light energy from said corresponding distal fiber light energy output end of said at least one said optical fiber and to focus said light energy outward from said distal fiber light energy output end.

17. A method in accordance with claim 16, wherein said plurality of optical fibers are disposed in a flexible casing, thereby forming an optical fiber bundle.

18. A method in accordance with claim 17, wherein said light energy source comprises a plurality of said optical fiber bundles, each said optical fiber bundle having an associated said focal lens.

19. A method in accordance with claim 18, wherein a composite shell is disposed around said associated focal lenses.

20. A method in accordance with claim 15, wherein said material is a rock material.

21. A method in accordance with claim 20, wherein said rock material is melted, moved outwardly from said focal area and cooled, thereby creating a hardened casing of material around a periphery of said borehole.

* * * * *